United States Patent
Lee

(10) Patent No.: US 11,519,210 B2
(45) Date of Patent: Dec. 6, 2022

(54) SLIDING WINDOW/DOOR SYSTEM INCLUDING ANNULAR ROLLER DEVICE FOR SLIDING WINDOW/DOOR

(71) Applicant: FILOBE CO., LTD., Gyeongsangbuk-do (KR)

(72) Inventor: Kwang-Seog Lee, Daegu (KR)

(73) Assignee: FILOBE CO., LTD, Daegu (KR)

( * ) Notice: Subject to any disclaimer, the term of this patent is extended or adjusted under 35 U.S.C. 154(b) by 0 days.

(21) Appl. No.: 17/057,873

(22) PCT Filed: May 24, 2019

(86) PCT No.: PCT/KR2019/006289
§ 371 (c)(1),
(2) Date: Nov. 24, 2020

(87) PCT Pub. No.: WO2019/226022
PCT Pub. Date: Nov. 28, 2019

(65) Prior Publication Data
US 2021/0301572 A1  Sep. 30, 2021

(30) Foreign Application Priority Data

May 24, 2018  (KR) .......................... 10-2018-0058714

(51) Int. Cl.
*E05D 15/06* (2006.01)
*E05D 15/08* (2006.01)
*E06B 3/46* (2006.01)

(52) U.S. Cl.
CPC ..... *E05D 15/0678* (2013.01); *E05D 15/0673* (2013.01); *E05D 15/08* (2013.01);
(Continued)

(58) Field of Classification Search
CPC .................................................. F16C 29/0619
(Continued)

(56) References Cited

U.S. PATENT DOCUMENTS 1,835,125 A * 12/1931 Vegren ................ E05D 15/0678
16/88
2,708,285 A * 5/1955 Greenspon .......... E05D 15/0678
16/88
(Continued)

FOREIGN PATENT DOCUMENTS

JP           06255544 A  *  9/1994
JP        2015-517040 A     6/2015
(Continued)

OTHER PUBLICATIONS

PCT/ISA/237 in application PCT/KR2019/006289.
PCT/ISA/210 in application PCT/KR2019/006289.

*Primary Examiner* — Marcus Menezes
(74) *Attorney, Agent, or Firm* — Neifeld IP Law PLLC

(57) ABSTRACT

The present invention provides an annular roller device for a sliding window/door, which is proposed as a roller device having a new structure wherein the roller device installed under a door sash can move a sliding window/door having heavy weight, and can maximize the open glass portion of the window/door by minimizing the height of the space required to install the roller device, thereby providing a more open view. The roller device has a structure in which, even when a rail installed on a window frame is not horizontal or the bottom portion of a window is not completely flat, all multiple rolling members, which constitute a ring-shaped rolling unit wound around a load-bearing plate (1220) comprising segment bodies (1221, 1222) rotatably connected to each other by a pivot pin (1225) extending therethrough, form contact points with the rail or the bottom portion, and thus each of the rolling members is prevented from being loaded with excessive weight.

3 Claims, 18 Drawing Sheets

(52) U.S. Cl.
CPC ....... *E06B 3/4609* (2013.01); *E05Y 2201/646* (2013.01); *E05Y 2201/656* (2013.01); *E05Y 2201/684* (2013.01); *E05Y 2900/148* (2013.01)

(58) Field of Classification Search
USPC .......................................................... 384/44
See application file for complete search history.

(56) References Cited

U.S. PATENT DOCUMENTS

| | | | | |
|---|---|---|---|---|
| 3,219,398 | A * | 11/1965 | Anderson | F16C 33/508 |
| | | | | 384/44 |
| 3,410,614 | A * | 11/1968 | Shaw, Jr. | F16C 33/52 |
| | | | | 384/44 |
| 3,920,289 | A * | 11/1975 | Demay | F16C 29/001 |
| | | | | 384/44 |
| 3,950,040 | A * | 4/1976 | Fall | A47B 88/493 |
| | | | | 384/45 |
| 4,272,923 | A * | 6/1981 | Anderson | E05F 15/56 |
| | | | | 49/360 |
| 4,348,063 | A * | 9/1982 | Chambers | A47B 88/493 |
| | | | | 312/334.11 |
| 4,352,526 | A * | 10/1982 | Imai | F16C 29/0619 |
| | | | | 384/44 |
| 4,561,703 | A * | 12/1985 | Dabringhaus | F16C 29/0619 |
| | | | | 384/44 |
| 4,666,316 | A * | 5/1987 | Stark | F16C 29/0619 |
| | | | | 384/44 |
| 5,273,363 | A * | 12/1993 | Prete | E05D 15/066 |
| | | | | 384/42 |
| 6,807,775 | B2 * | 10/2004 | Hoare | E05F 15/638 |
| | | | | 474/133 |
| 7,628,266 | B2 * | 12/2009 | Reist | F16C 29/0614 |
| | | | | 198/779 |
| 7,785,011 | B2 * | 8/2010 | Reist | B65G 7/04 |
| | | | | 384/44 |
| 2009/0019665 | A1 * | 1/2009 | Kelley | E05D 15/066 |
| | | | | 16/105 |

FOREIGN PATENT DOCUMENTS

| | | |
|---|---|---|
| KR | 10-2011-0001026 A | 1/2011 |
| KR | 1020110001026 | 1/2011 |
| KR | 10-2012-0119728 A | 10/2012 |
| KR | 1020120119728 | 10/2012 |
| KR | 10-2013-0124444 A | 11/2013 |
| KR | 1020130124444 | 11/2013 |
| KR | 27517040 | 6/2015 |
| KR | 10-2016-0095890 A | 8/2016 |
| KR | 20150204 | 8/2016 |

* cited by examiner

SLIDING WINDOW/DOOR SYSTEM INCLUDING ANNULAR ROLLER DEVICE FOR SLIDING WINDOW/DOOR

TECHNICAL FIELD

The present invention relates to a sliding window system having an annular roller device for sliding windows. More specifically, it relates to an annular roller device for a sliding window system capable of stably supporting and moving a large sliding door/window (hereinafter, collectively referred to as 'sliding window') of a high load on a floor surface on which a sliding window is installed, capable of minimizing the installation space by minimizing the dimensions of the roller device and door guide frame that support heavy-duty sliding windows, and capable of providing excellent applicability in various fields by ensuring a wide field of view, when applied to a window.

BACKGROUND ART (PRIOR ART)

In general, according to the configuration of the door chassis (A glass window, etc. may be installed inside, hereinafter will be described focusing on a door with a glass window, that is "a window") and the door guide frame (being installed on the wall, floor, ceiling, etc. of the building so that the door chassis is sliding guided to open and close), constituting the sliding window system most commonly used as a window system in most buildings in terms of cost reduction such as efficiency of opening and closing space and convenience of construction, as shown in FIG. 1a, FIG. 1b, and FIG. 1c, respectively, with comprising a rail 2 of a door guide frame 1 (also referred to as 'window frame') and a roller 6 installed under a door chassis 3 (also referred to as 'window chassis frame') through which glass is inserted, the roller 6 supports the load of the door chassis 3 on the rail 2 and has a structure in which opening and closing is performed in a sliding manner.

Hereinafter, a more detailed configuration of the roller 6 according to the prior art illustrated in FIGS. 1b and 10c will be described. As shown in FIGS. 1d and 10e, the roller 6 comprises; a support bracket 10 installed on the door chassis 3; a cylindrical bearing part 20 in line contact with the rail 2; and a shaft 30 that is fixed to the support bracket 10 and inserted into a central hole 20a of the bearing part 20. In particular, the cylindrical bearing part 20 of the conventional window roller 6 comprises a cylindrical inner member 21; a plurality of balls 22 provided along a circumference of the cylindrical inner member 21; and a ball spacing member 23 provided between the plurality of balls 22 in order to maintain the respective spacing between the plurality of balls, and a cylindrical outer member 24 that is concentric with the cylindrical inner member 21 and surrounds an outside of the plurality of balls 22; and a protective member 25 surrounding an outer circumferential surface of the cylindrical outer member 24.

Accordingly, when the door chassis 3 is moved by applying an external force EF, the door chassis 3 slides smoothly on the rail 2 through the bearing part 20 of the roller 6. In particular, since only one bearing unit moves while in line contact with the rail 2, the concentrated load P is transmitted to the line contact surface LCP of the bearing unit 20. However, the conventional roller 6 for window having this structure may have the following problems.

First, when the load P of the door chassis 3 is intensively transmitted to the lower portion of the cylindrical inner member 21 through the support bracket 10 and the shaft 30, as the gap between the first ball 22a and the second ball 22b is widened, the ball spacing member 23 may be deformed. This deformation may result in the bearing part 20 not rolling on the rail 2 because the rotation of the first ball 22a and the second ball 22b is ultimately prevented.

Second, when the load P of the door chassis 3 is large, the repulsive force RF of the rail 2 also increases, and the protection member 25 and the cylindrical outer member 24 located on the line contact surface LCP can be transformed. This deformation may ultimately result in the bearing part 20 not rolling over the fixed part 2.

Third, the thickness of the ball spacing member 23, the protection member 25, and the cylindrical outer member 24 may be increased to prevent deformation, but when the thickness is increased, the size of the roller should be also increased. Therefore, there may be a problem that it cannot be installed in a place where the installation space is limited.

Fourth, the shape of the bearing unit 20 and the central hole 20a formed in the cylindrical bearing unit 20 to insert the shaft 30 are factors that increase the height of the installation space. That is, as long as the bearing part 20 has the central hole 20a, there may be a limit to reducing the height of the installation space.

Here, the installation space refers to a space already determined for mounting the rollers 6, and since the height of the door chassis 3 is predetermined, when the height of the roller installation space cannot be arbitrarily changed, there may be a case in which the conventional roller 6 cannot be installed in the roller installation space. Nevertheless, if the roller 6 is to be installed necessarily, a separate installation space must be secured inside the door chassis 3. To this end, the height of the window glass installed inside the door chassis 3 must be reduced. This presents a disadvantageous problem in providing a fully open field of view.

Furthermore, in the process of continuously applying a large load of the door chassis 3 to the door guide frame 1 in accordance with the trend of increasing the size of the window, sagging or deformation is induced in the part of the rail 2 where the load is concentrated, which causes obstacles in the opening and closing operation of the sliding window.

Therefore, as a method for solving the problems of the rolling failure of the roller described above, as a hanger structure different from the above-described lower roller structure, a large roller capable of withstanding a high load is hung on the rail formed in the upper frame constituting the door guide frame. Although the hanger structure to be used has been suggested, in the case of such a hanger structure, particularly, the problem of sagging in the middle of the rail poses a difficult problem to solve.

Particularly, in the case of a pair glass window system that is commonly used in recent years, the weight reaches 300 kg when two sheets of 6 mm thick glass are attached and used, each of which has a height and width of 3,000 mm. In the case of improving and using a roller according to the prior art capable of supporting such a high weight, the diameter of the roller reaches about 45 mm, resulting in a problem of insufficient installation space. Furthermore, as a more special case, it is desired to increase the width of the window to secure a more open view even when the window is closed, or to provide a passage for large items (large trucks, etc.) when the window is open by sliding the window. In such cases, a sliding window (with a weight of about 600 kg) with pair glass with a width of about 6,000 mm (6 m) is required. In this case, there is a problem in that it is impossible to provide the necessary supporting force with the roller according to the prior art.

Even in the case of a general-scale sliding window of 1,200 mm×2,400 mm, which is not such a large scale, the weight of the window reaches 100 kg when it is composed of pair glass. In the case of using a general roller according to the prior art (load-resistant 30 kg), a pair of rollers in which two rollers are continuously arranged in a row are installed on both sides of a window and used to bear the weight of 120 kg. In recent years, as the case of installing high-weight window casement hardware has increased due to the high-end of windows, there are cases in which the size (diameter) of the rollers arranged to increase the load-bearing load has to be increased. The height of the lower end of the frame (aluminum frame) is increased, and thus, a problem in that heat loss is increased (energy efficiency decrease) is exposed.

According to Korean Patent Registration No. 10-1060234 (published on Sep. 11, 2011), which has been patented and registered by the applicant of the present application, as one of the improvement measures to solve this problem, the door roller unit 200 provided as a roller device of a new structure, as shown in FIGS. 2a to 2e, comprises, a housing 210 with an open lower part; a flat load support plate 220 that is mounted inside the housing 210 and supports the load of the movable window 300; and an annular rolling unit 230 wound around the load support plate 220 so as to rotate about the load support plate 220 as an axis when the movable window 300 is moved along the central rail 110 of the window frame 100. Wherein, the annular rolling unit 230 comprises a plurality of rolling members 231 and a link unit 232 connecting the 231 to each other so that a plurality of rolling members 231 are evenly disposed on the surface of the load support plate 220 at a set interval.

In addition, as shown in FIG. 2e, the above-described door roller unit 200 may further include a guide unit 240 for guiding the annular rolling unit 230 to the load support plate 220 without a left/right slipping. As an example, the guide unit 240 comprises, a guide rail 241 formed on the load support plate 220 and formed along the circumference thereof; and guide grooves 242 formed in each of the plurality of rolling members 231 to correspond to the guide rails 241.

According to Korean Patent Registration No. 10-1244670 (published on Mar. 31, 2013), which has been patented and registered by the applicant of the present application as another improvement method including an annular rolling unit, the accompanying drawings are shown in FIGS. 3a to 3d. As shown, an annular roller device including an annular rolling unit 200 wound around the load support plate 120 so as to rotate around the load support plate 120 as an axis has been proposed.

In the case of an annular roller device having an annular rolling unit according to the prior art, the number of contact points is increased by increasing the number of mutually connected rolling members (compare FIGS. 4A and 4B) when the load to be supported is increased. As shown in FIG. 3d, by increasing the number of contact points, it is possible to increase the load-bearing capacity, thus exhibiting high utility in a normal window system. However, as shown in FIGS. 4a and 4b, when the rail 430 installed on the window frame 2 does not form a horizontal plane or the lower part of the window 1 does not form a perfect plane (that is, the case of occurring the vertical displacement 'Δh(θ)' shown in the drawing), the contact point of only a part of the plurality of rolling members 310 (311, 312) constituting the annular rolling unit 300 wound around the load support plate 100, with the rail 430, is formed. As a result, there is a problem in that excessive loads P3 and P4 are applied only to some rolling members as shown in FIG. 4c.

DETAILED DESCRIPTION OF THE INVENTION

Technical Problem

The present invention has been made in order to solve the problems in the prior art and a technical object of the present invention is to provide an annular roller device for sliding windows proposed as a roller device of a new structure that can be installed under the door chassis to move the sliding window with a large load, and can provide a more open view by maximizing the part of the window that is opened by glass by minimizing the height of the required installation space. More specifically, even when the rail installed on the window frame does not form a horizontal plane or the lower part of the window does not form a completely flat surface, the contact points are formed in all of the plurality of rolling members constituting the annular rolling unit wound on the load support plate, respectively. Therefore, the technical object of the present invention is to provide a structure in which an excessive load is not applied to each rolling member.

Technical Solution

In order to solve the above-described problems, the present invention provides a sliding window system having an annular roller device for sliding windows and a door guide frame supporting the same, the sliding window system comprises, a chassis support unit formed integrally including a chassis seating portion formed at an upper center portion to accommodate a lower portion of the door chassis constituting the sliding window and a load support plate provided under the chassis seating portion;

an annular rolling unit comprising a plurality of rolling members formed in a cylindrical shape provided in the transverse direction perpendicular to the door moving direction, and a chain link unit connecting the two rolling members to each other so that the plurality of rolling members are evenly arranged in an annular shape on the surface of the load support plate at a set interval along the door moving direction, wherein annular rolling unit being wound around an upper surface and a lower surface of the load support plate of the chassis support unit and an arc of both ends formed on the side of the door traveling direction to connect the upper surface and the lower surface; and a door guide frame provided with a rolling support member along the door traveling direction to provide a rolling path of the plurality of rolling members constituting the annular rolling unit of the annular roller device for sliding windows, and further comprises, a straight guide unit which is provided for each of the plurality of rolling members constituting the annular rolling unit in order to roll along the travel direction of the door chassis without sliding left/right on the load support plate, wherein, the straight guide unit comprising, a first guide rail formed on the load support plate and formed around the load support plate along a traveling direction of the door chassis;

a guide groove formed on an outer circumferential surface of each of the plurality of rolling members along a traveling direction of the door chassis to correspond to the first guide rail of the load support plate; and a second guide rail formed along the traveling direction of the door chassis on the upper surface of the rolling support body of the door guide frame to correspond to the guide grooves formed on the outer circumferential surfaces of each of the plurality of rolling members, wherein, the depth of the guide groove formed on the outer circumferential surface of each of the plurality of rolling members is set to be greater than the height of the first guide rail and the second guide rail, and wherein, the sliding window system with an annular roller device being characterized in that the load support plate of the chassis support part is composed of two split bodies along the sliding direction of the door (rail), and the connecting ends of two split bodies overlapping in the transverse direction are through-connected with a rotation pin.

Advantageous Effects

According to the present invention described above, the following effects can be obtained.

In recent years, the load of moving objects is applied to the line contact surface of the bearing part of the roller that provides the sliding action of the sliding window in order to solve the design flow for securing a more open view of the sliding window and the limitations of the application field of the sliding window. Unlike the prior art, in which the load of the moving object is completely concentrated on the line contact surface of the bearing part of the roller that provides the sliding action of the sliding window, in the present invention, since the plurality of rolling members support the sliding window while evenly distributing the load, it provides an effect of supporting the sliding window with a greater load than the prior art.

And, according to a preferred embodiment of the present invention, as the straight guide unit is provided, even if the load support plate is inclined, the phenomenon that the annular rolling unit is tilted in the inclined direction can be prevented in advance. It is possible to prevent the phenomenon that the annular rolling unit slides to the left or right side of the load support plate that may occur while the annular rolling unit is rotating. In addition, even when the rail installed on the window frame does not form a horizontal plane or the lower part of the window does not form a completely flat surface, it has the effect of preventing excessive load from being applied to some rolling members by allowing more contact points to be formed over the entire plurality of rolling members constituting the annular rolling unit, which is wound around the load support plate connected along the rail progress so as to be mutually rotatable.

Furthermore, when the load supporting plate according to the present invention, which is composed of two split bodies and the connecting ends of two split bodies overlapping divisions are connected through a rotation pin, is rotated by a set angle, simplification of the manufacturing process can be achieved by allowing the load support plate and the fitting assembly to be possible even when a plurality of rolling members constituting the annular rolling unit being connected as a whole through chain links unit.

In addition, while providing the effect of maximizing the portion of the window open to glass by minimizing the height of the required installation space while stably sliding the sliding window of such a large load, it is possible to secure good energy efficiency.

BRIEF DESCRIPTION OF THE DRAWINGS

FIGS. 1a to 10c are views showing a conventional sliding window system.

FIG. 10e is a cross-sectional view of FIG. 1d II-II.

FIG. 7 is a cross-sectional view and a plan view showing a structure of an annular roller device in a coupled state according to an embodiment of the present invention.

FIG. 8 is a cross-sectional view showing the operating state of the annular roller device according to an embodiment of the present invention.

MODE FOR CARRYING OUT THE INVENTION

Hereinafter, embodiments of the present invention will be described with reference to the accompanying drawings such that a person ordinarily skilled in the art to which the present invention belongs may easily embody the present invention. However, the present invention may be implemented in various forms and is not limited to the embodiments described herein.

Figure 7:
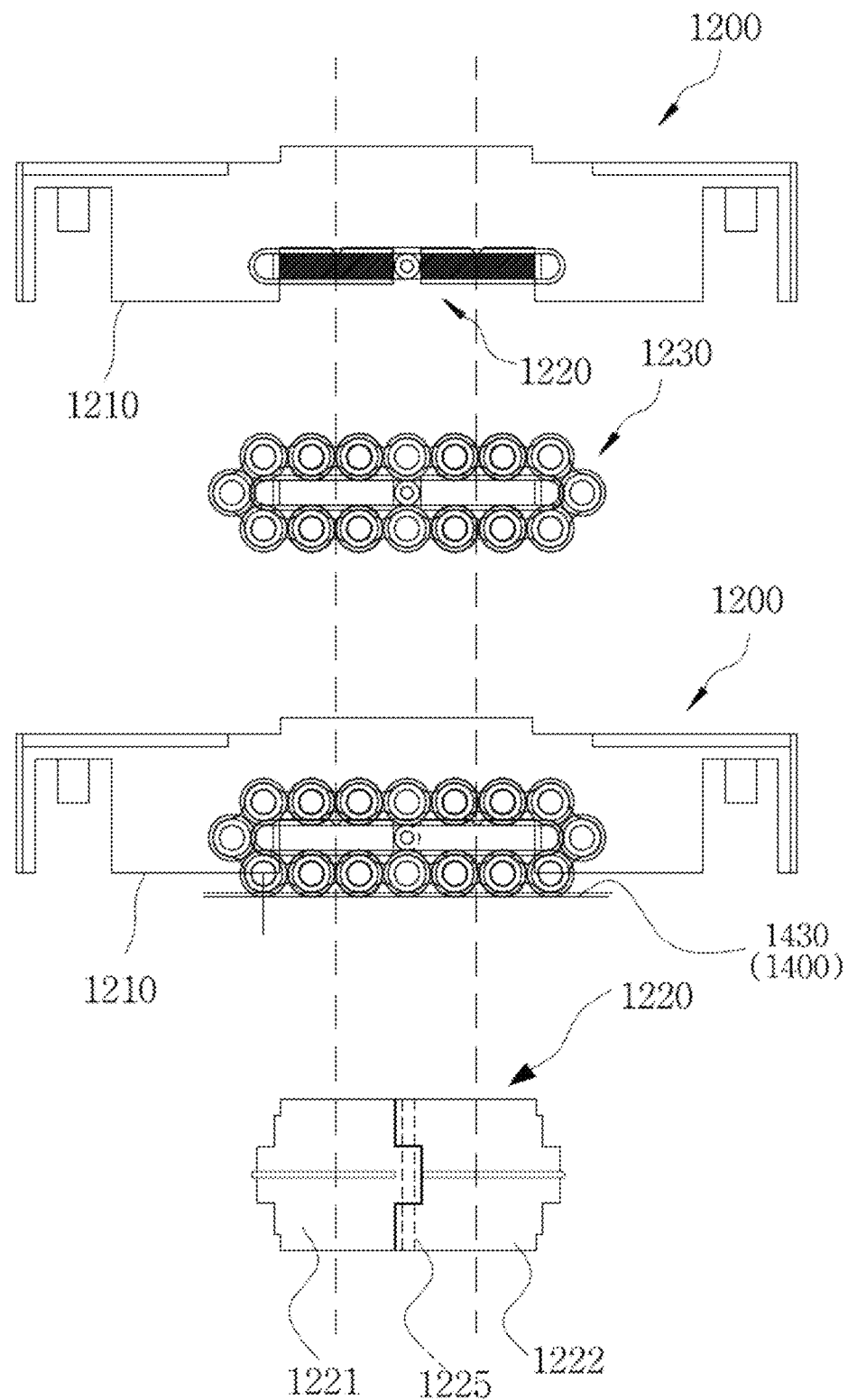
Figure 8:
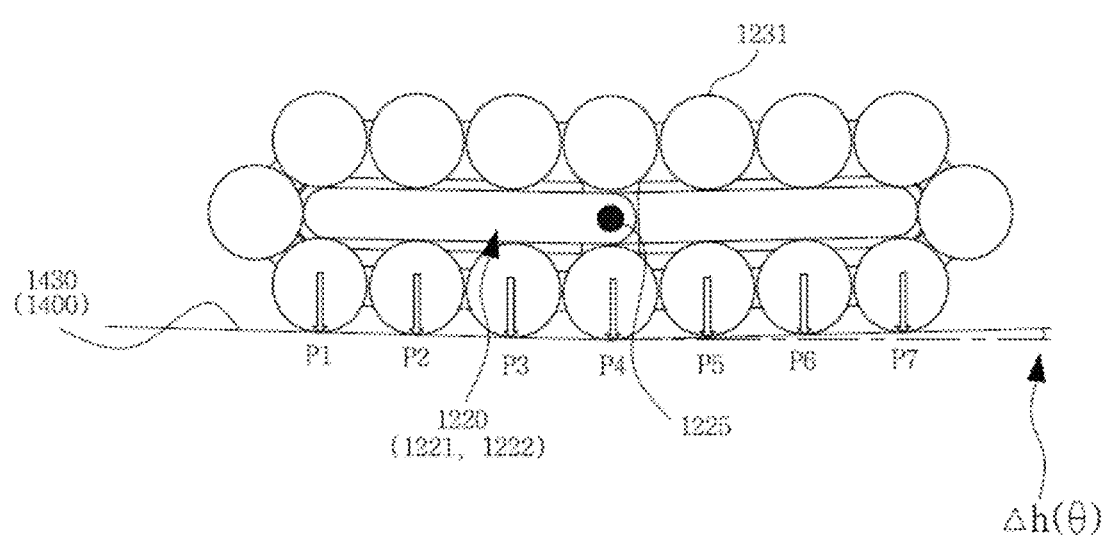

As described above, the present invention is intended to solve a problem of the prior art. An annular roller device constituting a sliding window system according to an embodiment of the present invention and its assembly process are shown in perspective views of FIGS. 5a and 5b, an exploded perspective view of FIG. 6a, and a side view of FIG. 6b, and a working state of the combined state Cross-sectional views are shown in FIGS. 7 and 8.

First, referring to these drawings, a sliding window system according to an embodiment of the present invention will be described as a sliding window system having an annular roller device 1200 for sliding windows and a door guide frame supporting the same, the sliding window system comprises, a chassis support unit 1210 formed integrally including a chassis seating portion formed at an upper center portion to accommodate a lower portion of the door chassis constituting the sliding window and a load support plate 1220 provided under the chassis seating portion;

an annular rolling unit 1230 comprising a plurality of rolling members 1231 formed in a cylindrical shape provided in the transverse direction perpendicular to the door moving direction, and a chain link unit 1232 connecting the two rolling members to each other so that the plurality of rolling members 1231 are evenly arranged in an annular shape on the surface of the load support plate 1220 at a set interval along the door moving direction, wherein annular rolling unit 1230 being wound around an upper surface and a lower surface of the load support plate 1220 of the chassis support unit 1210 and an arc of both ends formed on the side of the door traveling direction to connect the upper surface and the lower surface; and a door guide frame provided with a rolling support member along the door traveling direction to provide a rolling path of the plurality of rolling members 1231 constituting the annular rolling unit 1230 of the annular roller device 1200 for sliding windows, and further comprises, a straight guide unit 1400 which is provided for each of the plurality of rolling members 1231 constituting the annular rolling unit 1230 in order to roll along the travel direction of the door chassis without sliding left/right on the load support plate 1220, wherein, the straight guide unit 1400 comprising, a first guide rail 1410 formed on the load support plate 1220 and formed around the load support plate 1220 along a traveling direction of the door chassis;

a guide groove 1420 formed on an outer circumferential surface of each of the plurality of rolling members 1231 along a traveling direction of the door chassis to correspond to the first guide rail 1410 of the load support plate 1220; and a second guide rail 1430 formed along the traveling direction of the door chassis on the upper surface of the rolling support body of the door guide frame to correspond to the guide grooves 1420 formed on the outer circumferential surfaces of each of the plurality of rolling members, wherein, the depth of the guide groove 1420 formed on the outer circumferential surface of each of the plurality of rolling members is set to be greater than the height of the first guide rail 1410 and the second guide rail 1430, and wherein, the sliding window system with an annular roller device being characterized in that the load support plate 1220 of the chassis support part is composed of two split bodies 1221 and 1222 along the sliding direction of the door (rail), and the connecting ends of two split bodies overlapping in the transverse direction are through-connected with a rotation pin 1225.

Figure 5A:
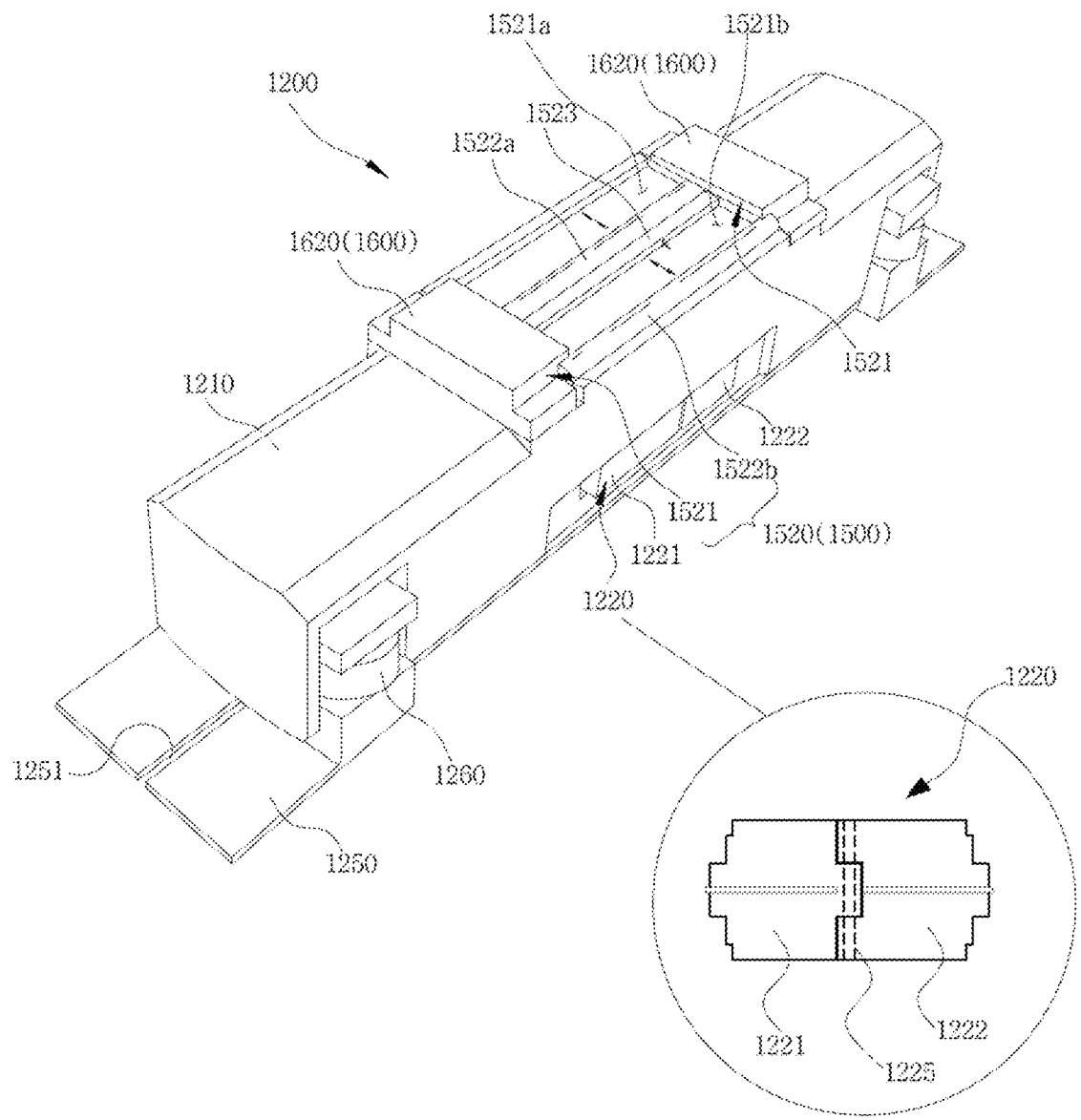
FIGS. 5a and 5b are perspective and bottom perspective views of an annular roller device according to an embodiment of the present invention, respectively.
Figure 5B:
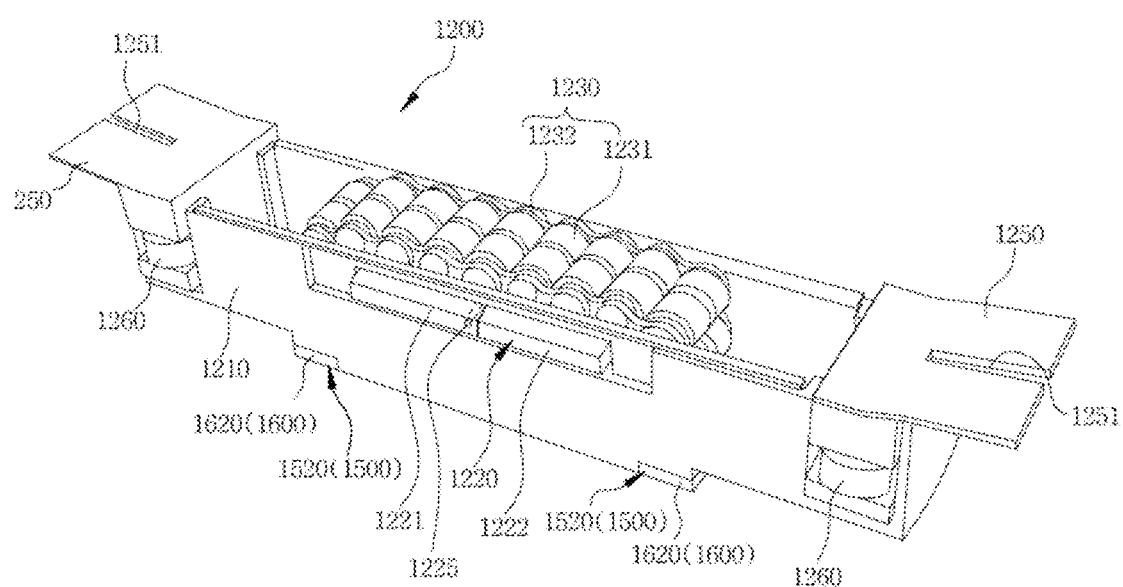

The annular roller device 1200 for sliding windows used in an embodiment of the present invention includes a chassis support 1210 including a load support plate 1220; and an annular rolling unit 1230, as shown in FIGS. 5a and 5b.

Figure 1A:
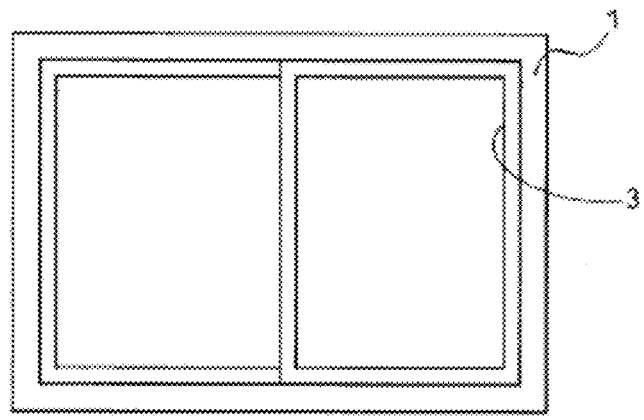
Figure 1B:
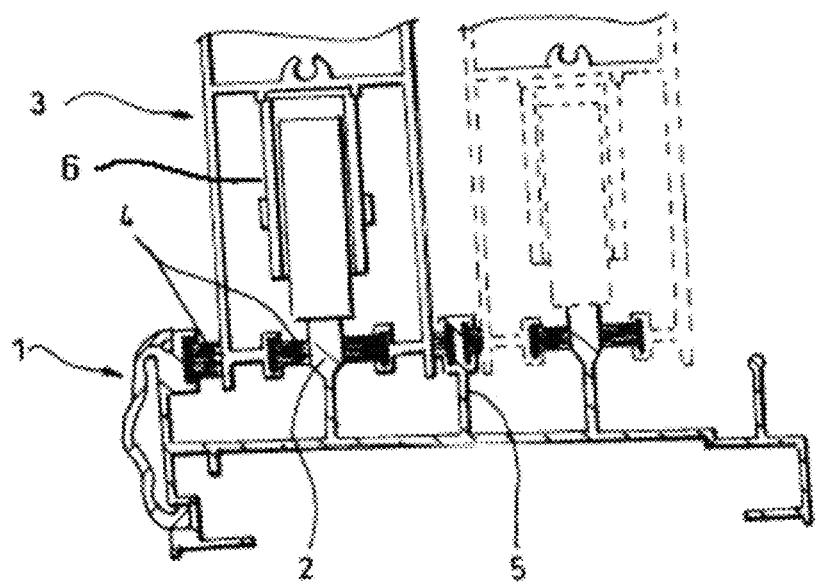
Figure 1C:
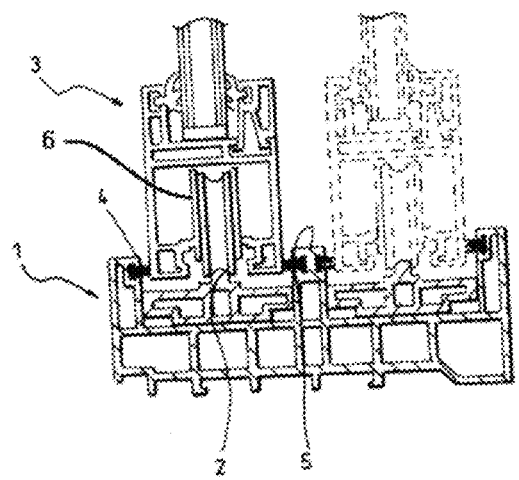
Figure 1D:
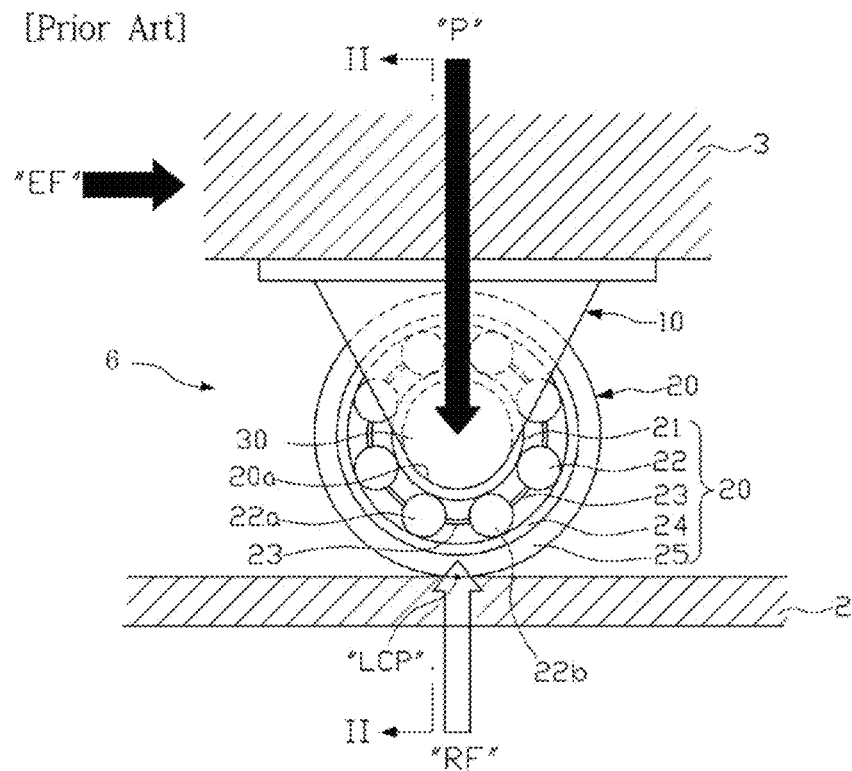
FIG. 1d is a front cross-sectional view showing a detailed structure of a roller device for windows and doors used in a conventional sliding window system.
Figure 1E:
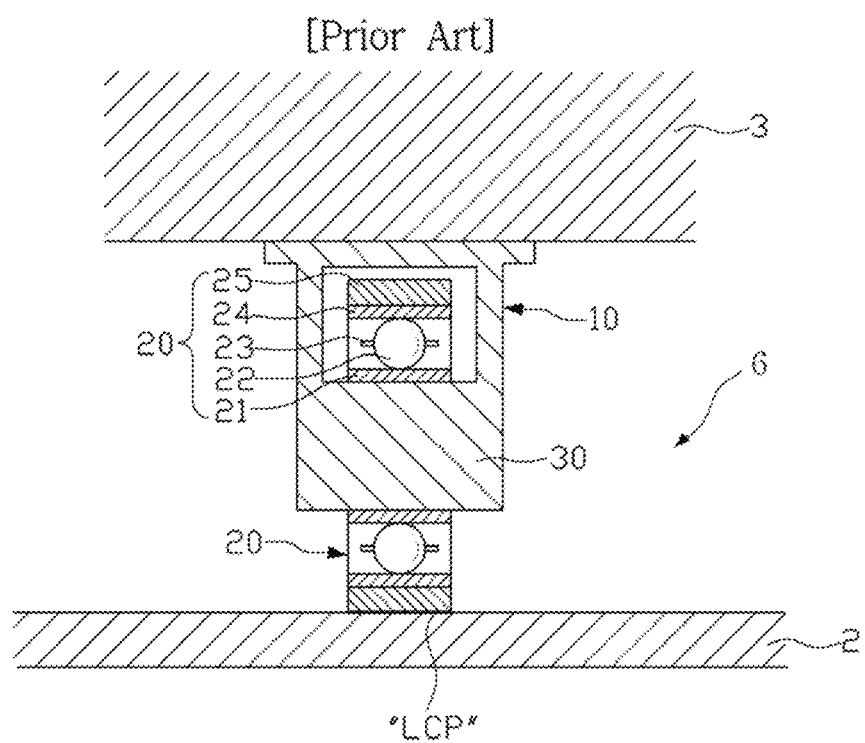
Figure 2A:
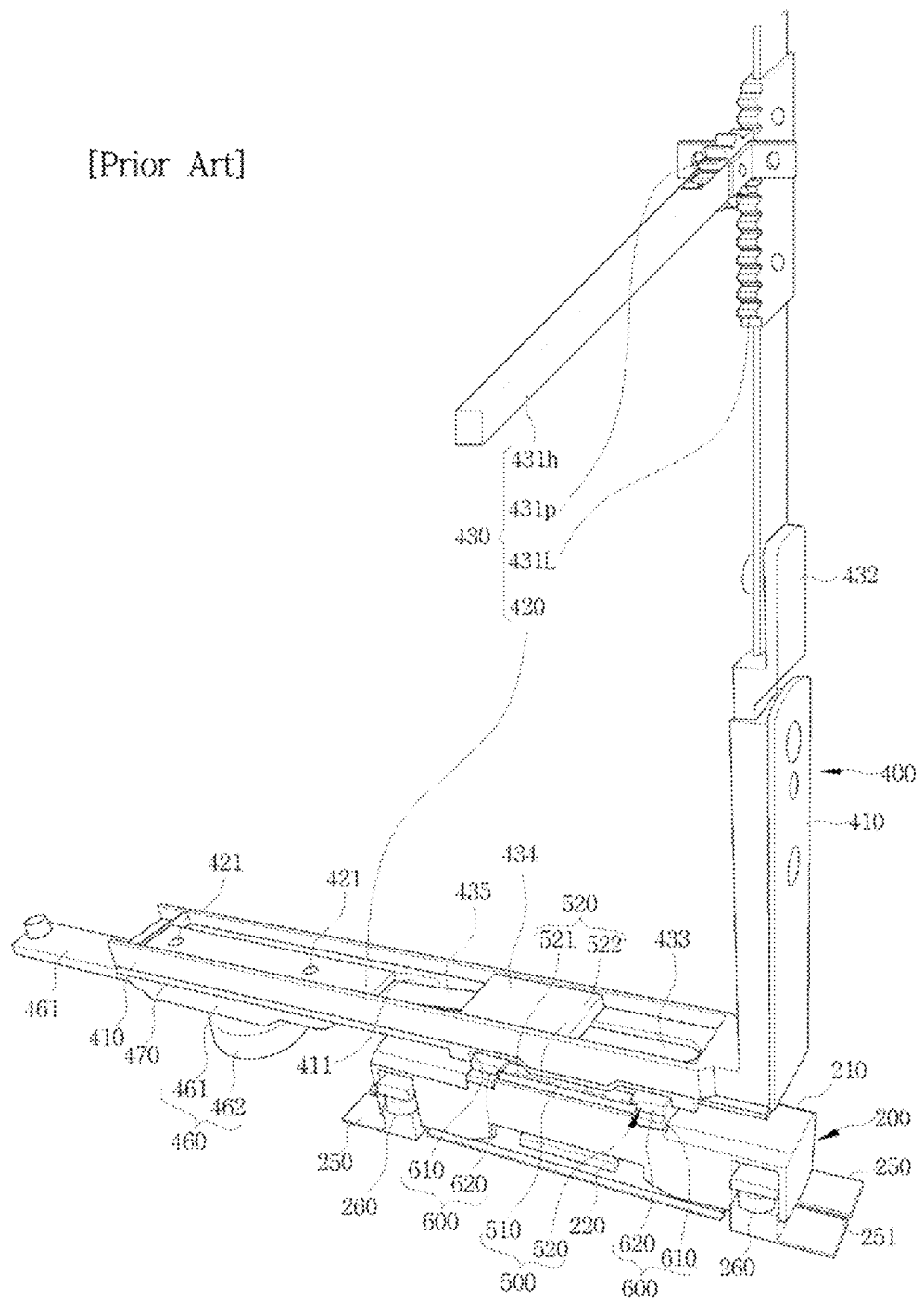
FIGS. 2a to 2e are views showing an annular roller device according to the existing Korean Patent Registration No. 10-1060234.
Figure 2B:
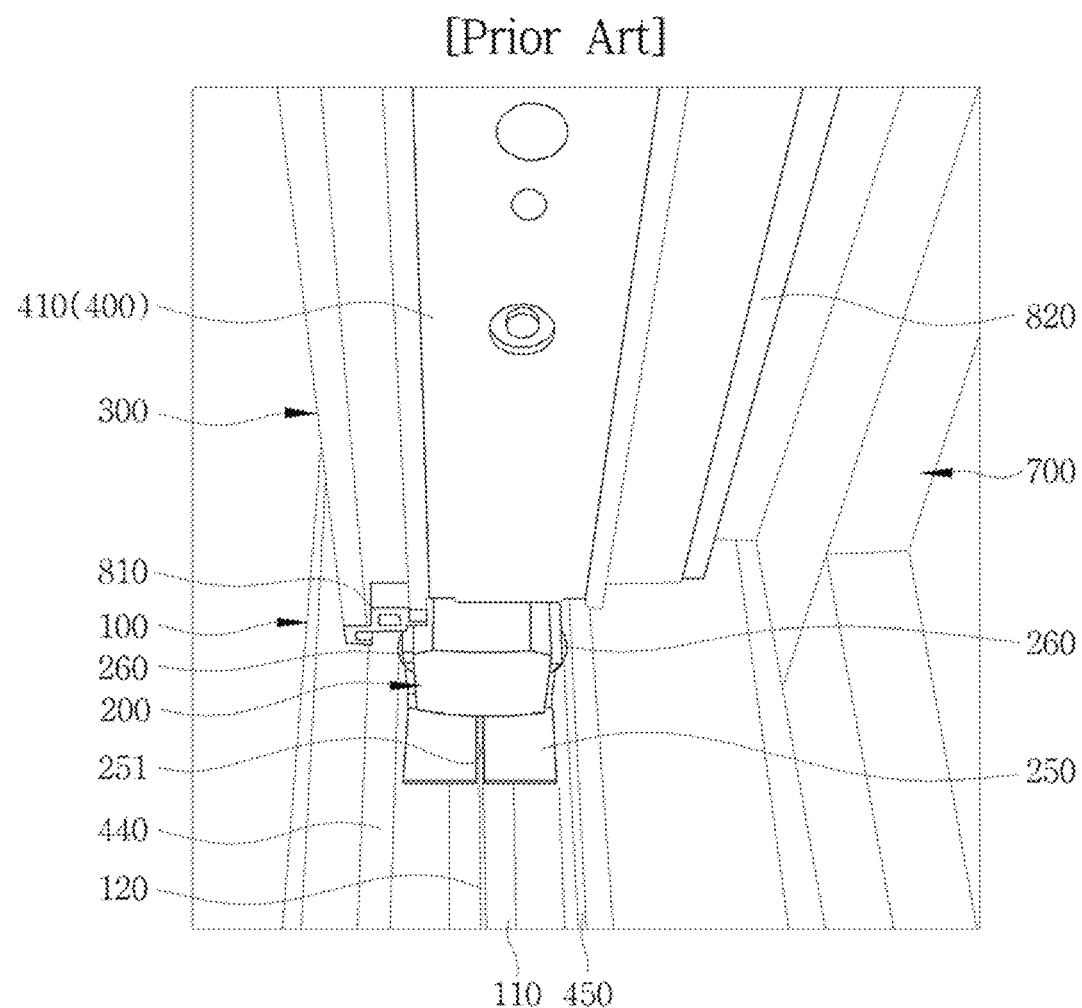
Figure 2C:
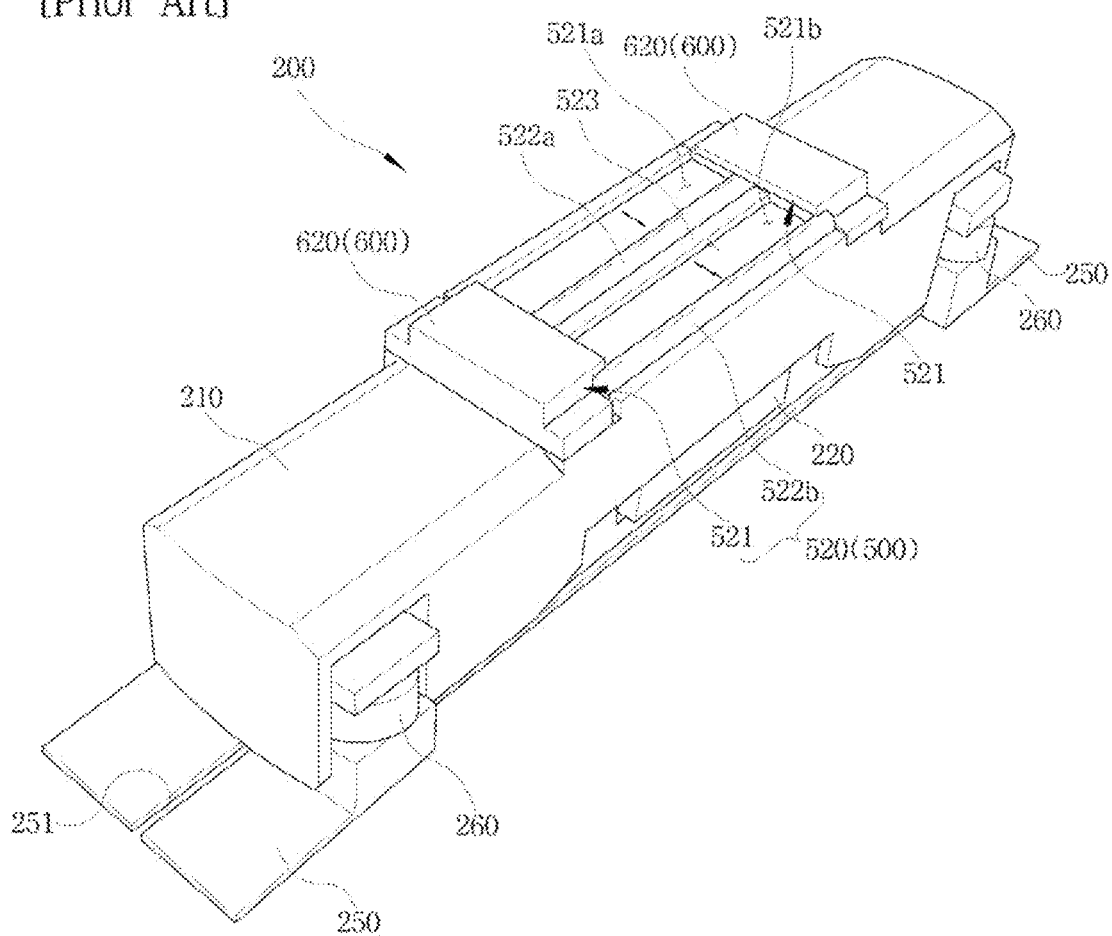
Figure 2D:
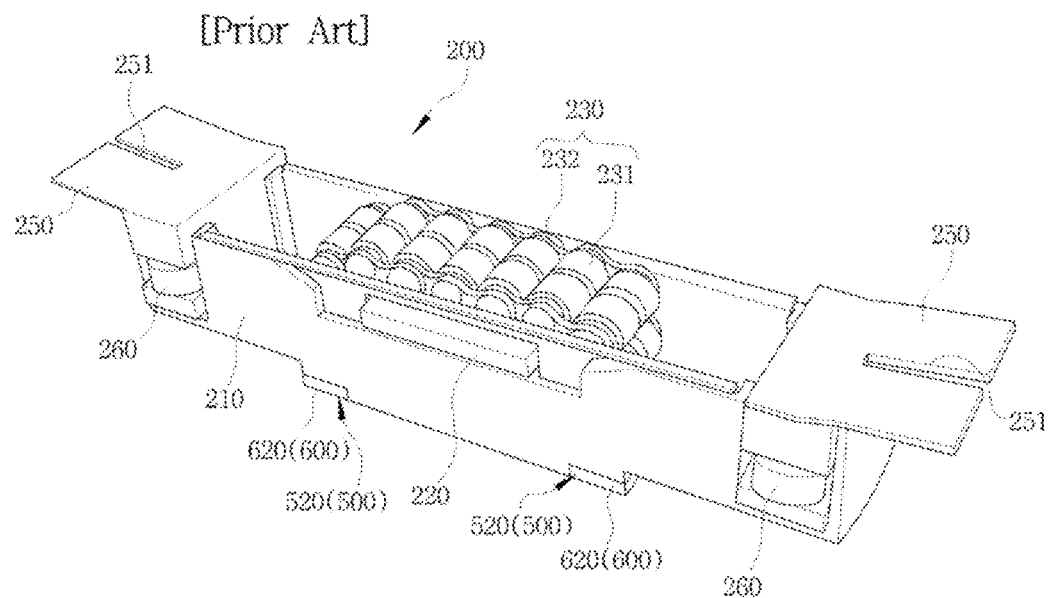
Figure 2E:
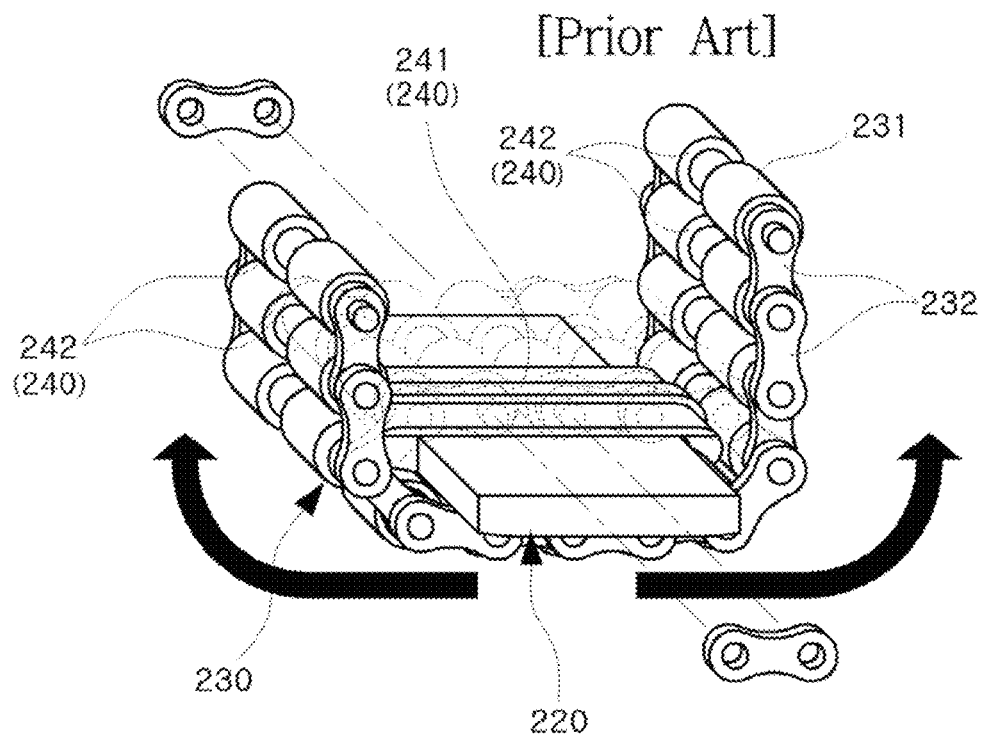
Figure 3A:
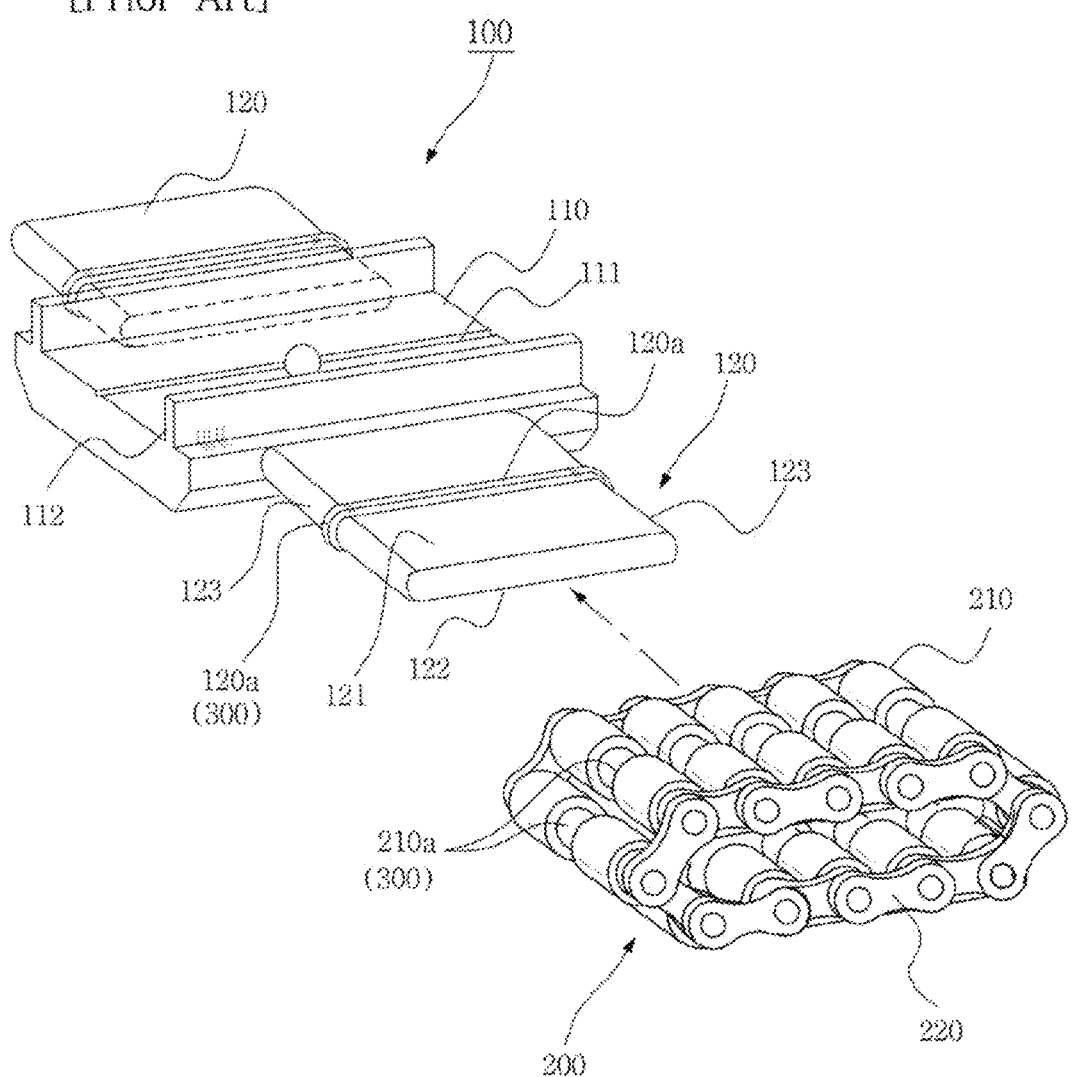
FIGS. 3a to 3d are views showing an annular roller device according to the existing Korean Patent Registration No. 10-1244670.
Figure 3B:
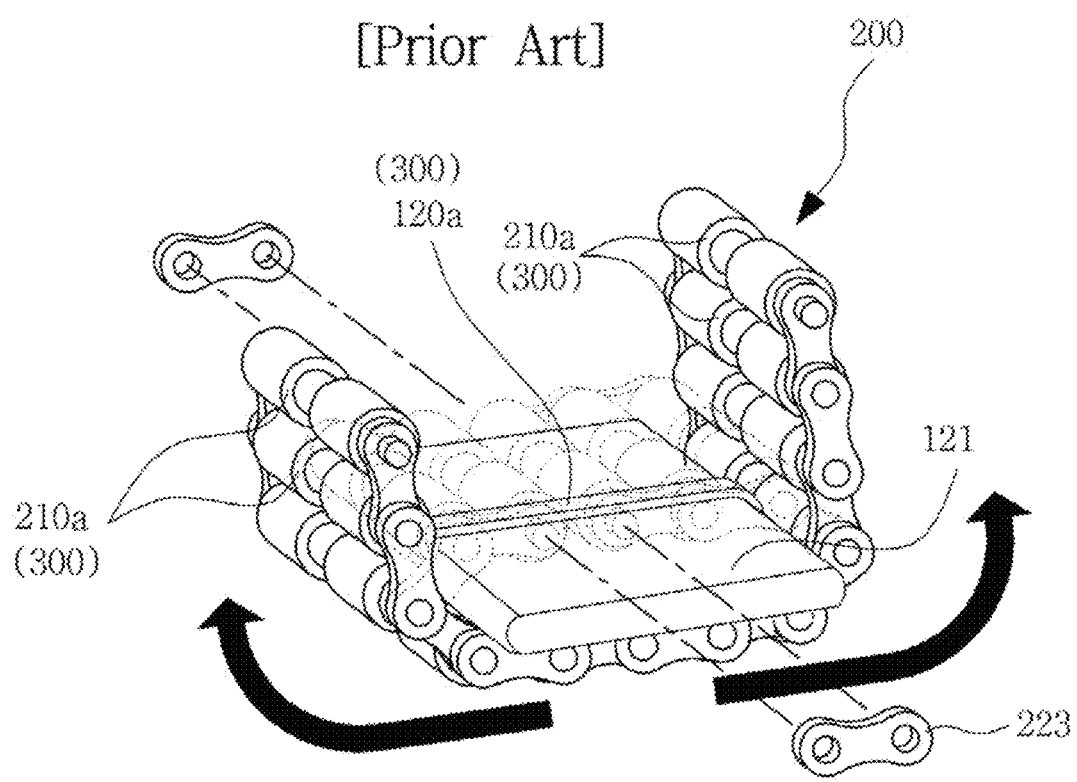
Figure 3C:
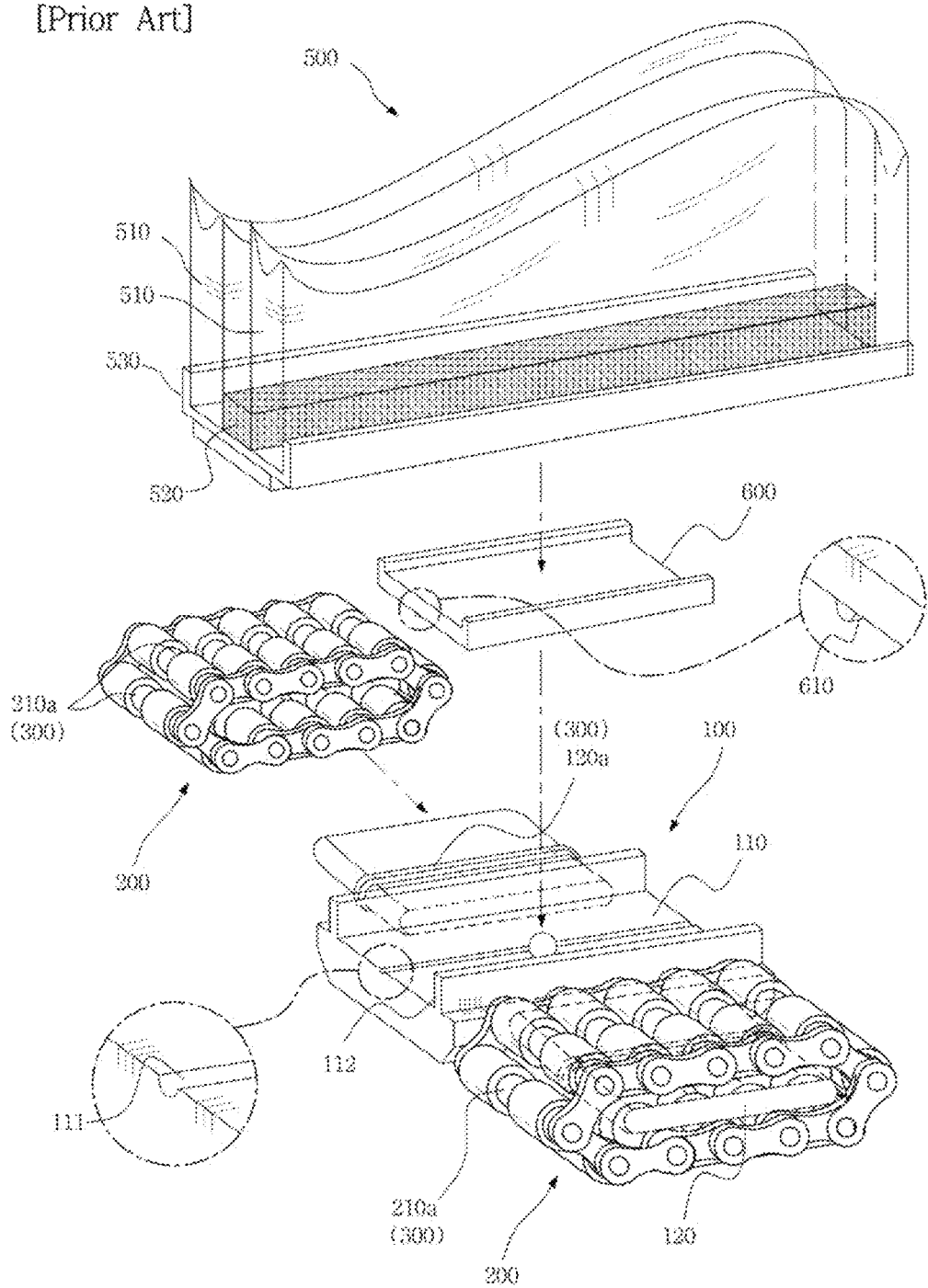
Figure 3D:
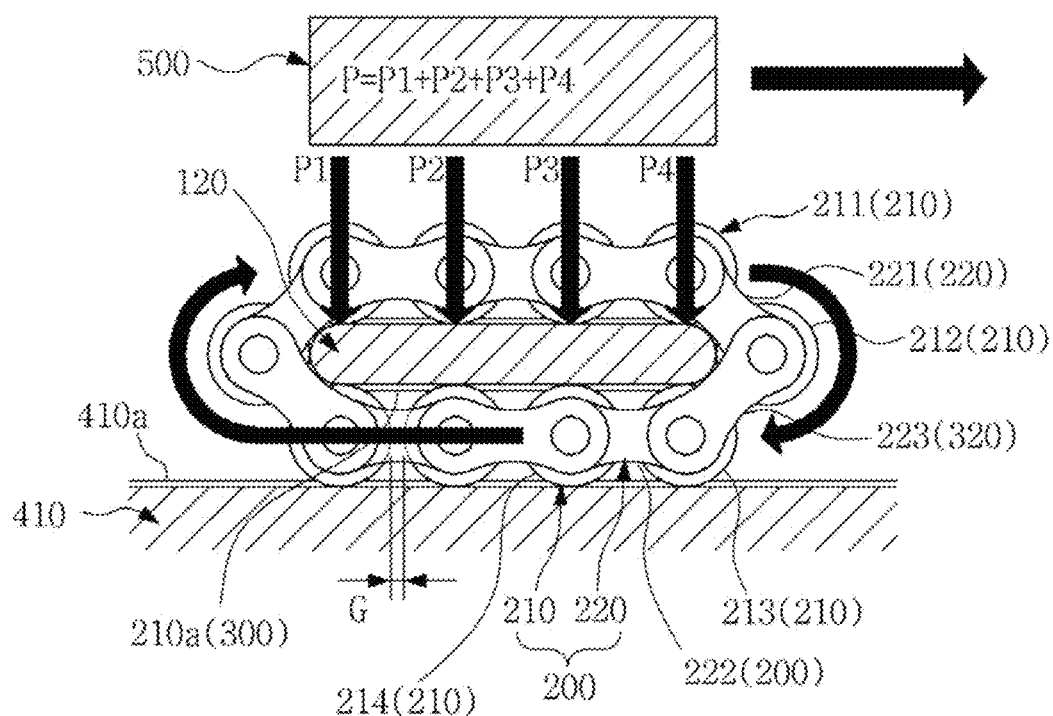
Figure 4A:
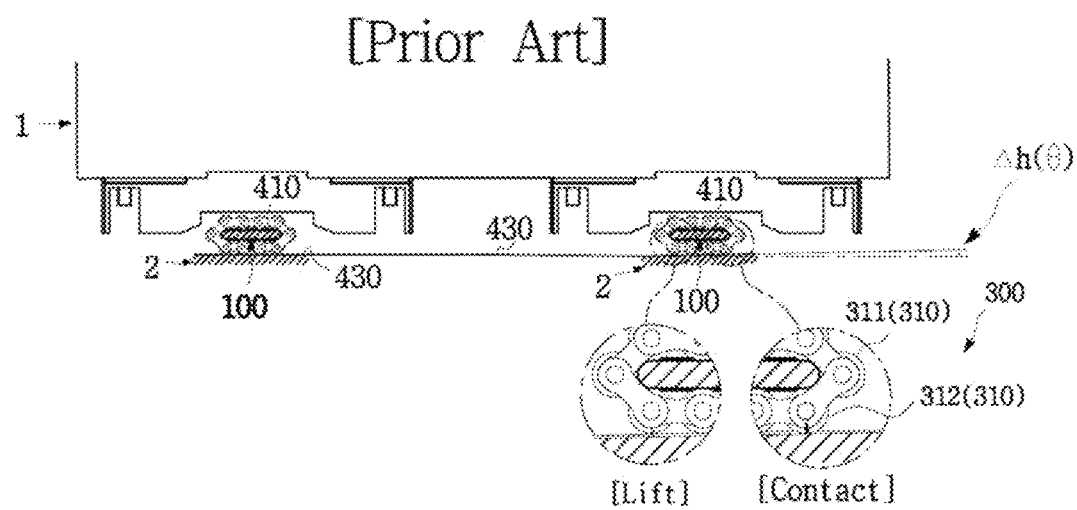
FIGS. 4a and 4b are diagrams illustrating a problem situation of the annular roller device shown in FIGS. 2a to 2e and the annular roller device shown in FIGS. 3a to 3d, respectively.
Figure 4B:
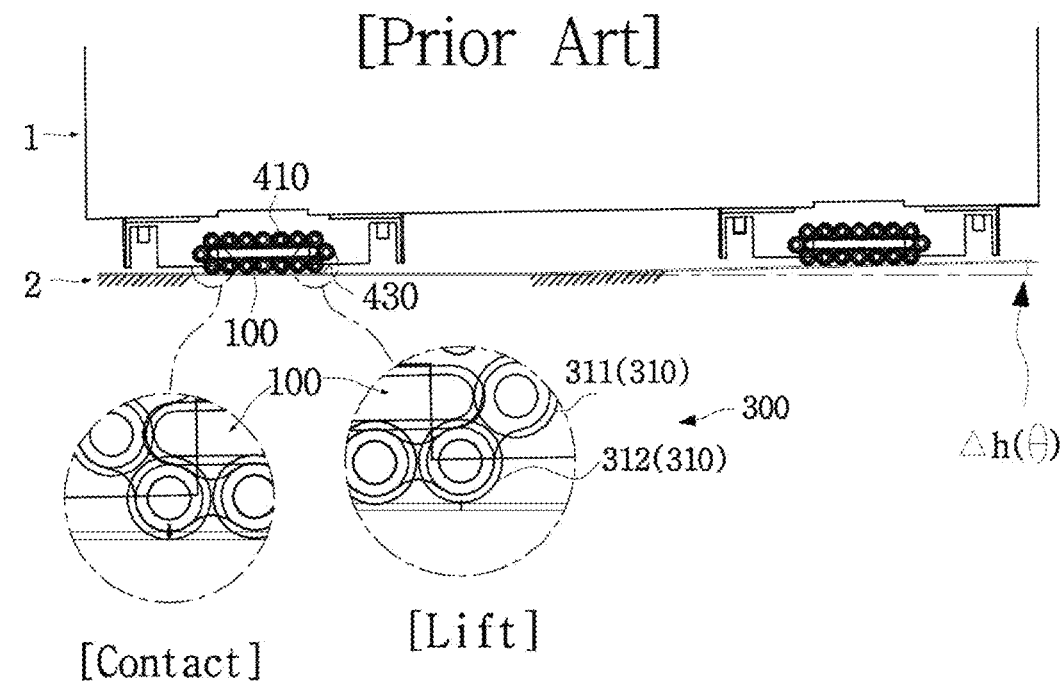
Figure 4C:
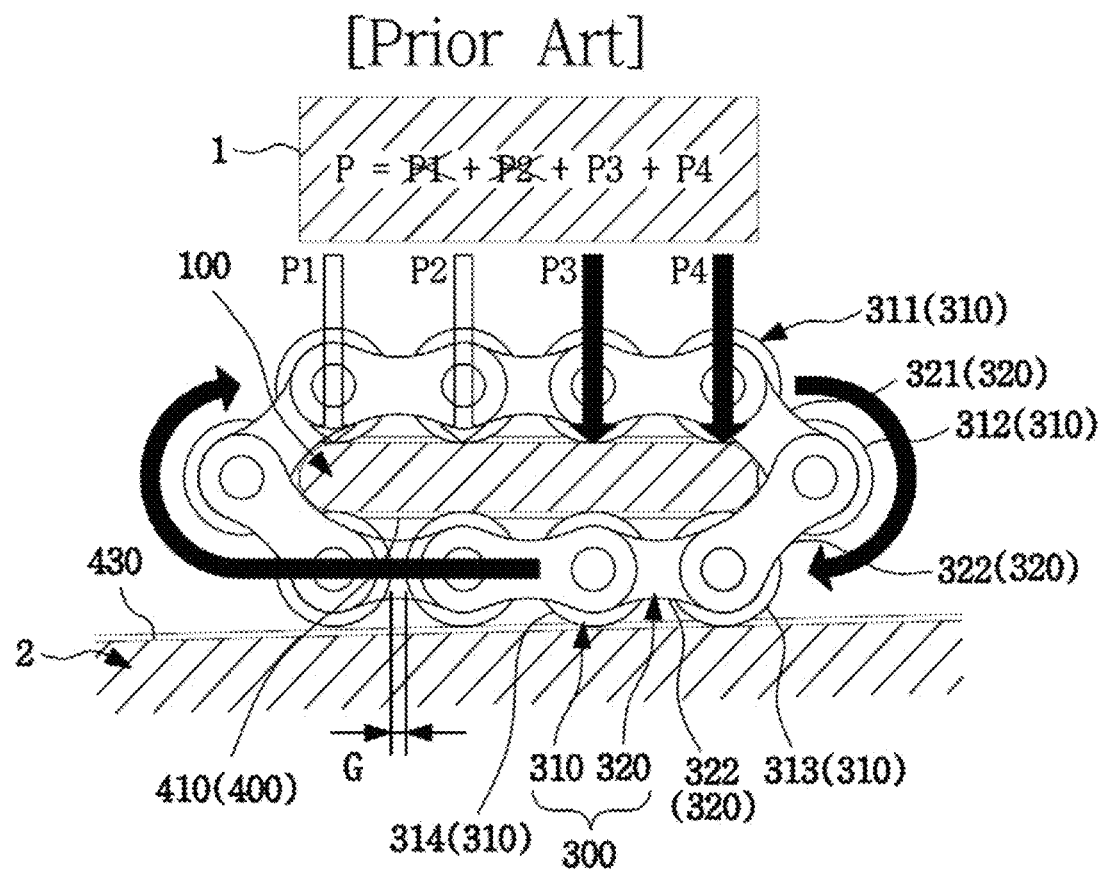
FIG. 4c is a pressure analysis diagram for these conditions.

Herein, the load support plates 1220 formed on both sides of the chassis support 1210 have a flat plate shape and support the load of the sliding window evenly from both sides while performing the role of the rotation axis of the annular rolling unit 200. This load support plate 120 does not have a cylindrical shape in which a central hole (refer to "20a" in FIG. 1e) is formed as in the prior art, but has a flat plate shape, thus providing the role of load transmission and load support through a large area. Its height can be significantly reduced. Therefore, it ultimately enables installation even when the height of the installation space is low. Further, as in the present invention, the load support plate 1220 is composed of two split bodies 1221 and 1222 along the sliding direction of the door (rail), and the connection ends where the split bodies 1221 and 1222 overlap in the transverse direction are connected through the rotation pin 1225. When the second guide rail 1430 installed on the window frame does not form a horizontal plane or the lower part of the window does not form a complete flat plane by connecting through the rotation pin 1225 (in the case of that a vertical displacement '$\Delta h(\theta)$' shown in the drawing occurs), by allowing a significant number of rolling members among the plurality of rolling members 1231 constituting the annular rolling unit 1230 wound around the load support plate 1220 according to the present invention to have the contact points P1 to P7 (see FIG. 8) on the second guide rail 1430 installed on the window frame, it is possible to alleviate the problem that excessive loads P3 and P4 are applied only to some rolling members as shown in FIG. 4c.

For reference, the annular rolling unit 1230 used in the present invention is, as shown in Figs.

For reference, the annular rolling unit 1230 used in the present invention, as shown in FIGS. 5a, 5b, 6a, and 6b, is wound around the load support plates 1220 on both sides of the chassis support part 1210 so as to rotate around the load support plate 1220 as an axis. More specifically, the annular rolling unit 1230 comprises a plurality of rolling members 1231; and a chain link unit 1232 connecting the plurality of rolling members 1231 to each other so as to be evenly disposed on the surface of the load support plate 1220, that is, the upper surface, the lower surface, and the arc surfaces of both ends at a set distance G from each other. Accordingly, the length of the annular rolling unit 200 may be adjusted according to the overall length of the load support plate 1220 by adjusting the number of rolling members 1231 and the length of the chain link unit 1232.

Each of the plurality of rolling members 1231 is formed in a cylindrical shape divided in a transverse direction perpendicular to the moving direction of the sliding window as shown, and is interposed between the bottom surface of the load support plate 1220 and the upper surface of the rolling support body of the door guide frame, as shown, while supporting the load of the sliding window and rotational moving the outer circumferential surface thereof while performing contact rolling. This makes it possible to move the sliding window. In addition, each of the plurality of rolling members 1231 may be made of a self-lubricating material. When using a self-lubricating material, you do not need to separately use a lubricant such as oil, so you can not only reduce the cost, but also keep the surroundings clean.

Figure 6A:
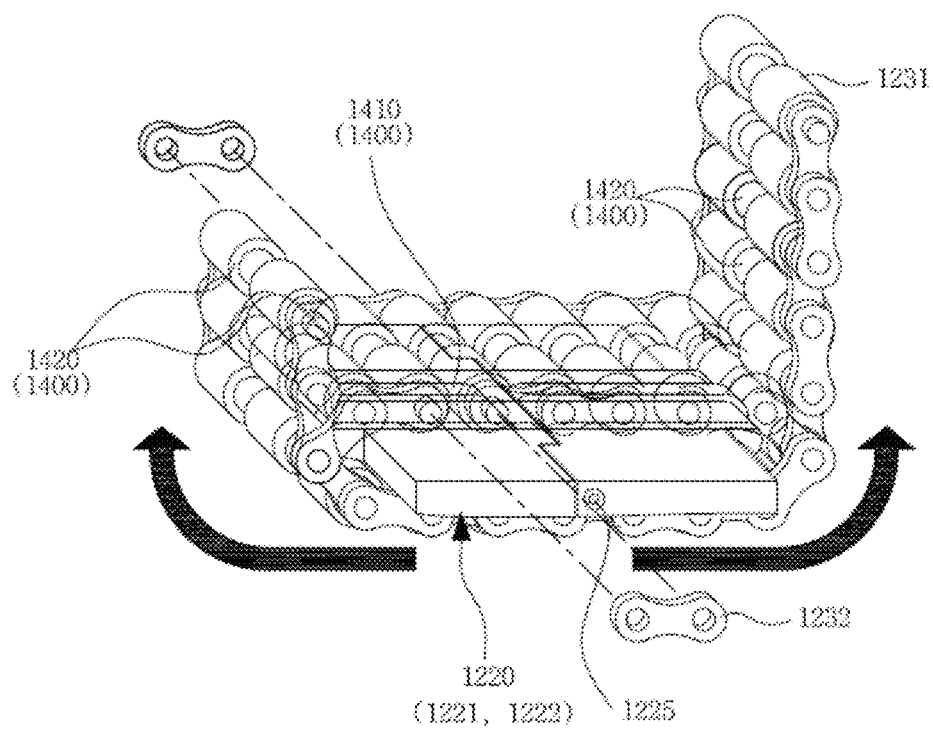
FIG. 6a is an exploded perspective view showing the assembly process of the main part of the annular roller device according to an embodiment of the present invention shown in FIG. 5a and FIG. 5b.
Figure 6B:
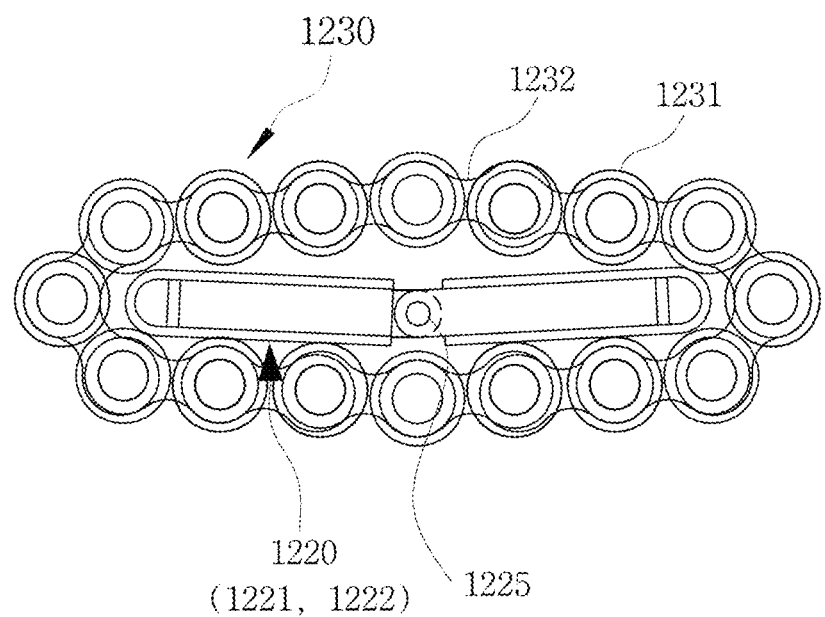
FIG. 6b is an embodiment of the present invention showing additional effects of the present invention, with a diagram showing a process of assembling the main parts of the annular roller device in a non-disassembled state.

Meanwhile, a state in which the plurality of rolling members 1231 are assembled to the load support plate 1220 is as shown in FIG. 6a. After the first assembly of a plurality of rolling members 1231, a complete assembly may be achieved by connecting the last chain link unit 1232. In addition, as shown in FIG. 6b, when the load support plate 1220 according to the present invention being composed of two split bodies 1221 and 1222, and the connection ends of the overlapping split bodies 1221 and 1222 is rotationally folded by a set angle through with a rotation pin 1225, it is possible to simplify the manufacturing process by allowing a plurality of rolling members 1231 as a whole to be fitted and assembled to the load support plate 1220, even when a plurality of rolling members 1231 constituting the annular rolling unit 1230 are connected as a whole by the chain link unit 1232.

In addition, the linear guide unit 1400 described above serves to guide the annular rolling unit 1200, wherein each of the plurality of rolling members 1231 constituting the annular rolling unit 1200 is able to rotate along the moving direction of the sliding window without sliding left/right of a load support plate 1220.

With the straight guide unit 1400, even if the load support plate 1220 is inclined left and right, a phenomenon in which the annular rolling unit 1230 is tilted in one direction (In other words, a phenomenon that prevents the smooth straight movement of the sliding door) can be prevented, and a phenomenon in which the annular rolling unit 1230 slides to the left or right side of the load support plate 1220 that may occur while the annular rolling unit 1230 rotates may be prevented. Thus, it is possible to prevent the external chain link unit 1223 from rubbing against the chassis support or the door guide frame, and as a result, the problem that the annular rolling unit 1230 is broken due to wear of the chain link unit 1223 can be prevented in advance.

Further, as shown in the drawings, it is preferable for both ends (front and rear ends) of the split (divided) bodies 1221 and 1222 of the load support plate 1220 being formed in an arc surface so that the plurality of rolling members 1231 can be smoothly rotated at both ends of the load support plate 1220.

However, the scope of the present invention to be protected is not limited thereto and may cover various types of sliding windows (door or window) to which the present invention is applied, and various modifications and changes using the basic concept of the present invention defined in the accompanying claims also belong to the scope of the present invention.

The invention claimed is:

1. A sliding window system, comprising:
an annular roller device for sliding windows; and
a door guide frame supporting said annular roller device;
wherein the sliding window system further comprises,
a chassis support unit formed integrally, said chassis support unit including a chassis seating portion and a load support plate assembly;
wherein the chassis seating portion is formed at an upper center portion of said chassis support unit to accommodate a lower portion of a door chassis;
wherein said load support plate assembly is located under the chassis seating portion;
wherein said load support plate assembly has an upper surface and a lower surface;
an annular rolling unit comprising a plurality of rolling members and a chain link unit;
wherein each one of the plurality of rolling members is formed in a cylindrical shape in a transverse direction perpendicular to a door moving direction;
wherein the chain link unit connects two of the plurality of rolling members to each other;
wherein the plurality of rolling members are evenly arranged in an annular shape at a set interval from one another;
wherein the plurality of rolling members are arranged so that the annular shape extends along the door moving direction
wherein the annular rolling unit extends around the upper surface and the lower surface of the load support plate assembly; and
wherein the door guide frame comprises a rolling support member and a straight guide unit;
wherein said rolling support member extends along said door moving direction to provide a rolling path;
wherein said straight guide unit is configured to inhibit said plurality of rolling members from sliding on said load support plate assembly in a direction that is perpendicular to the door moving direction;
wherein the straight guide unit comprises a first guide rail;
wherein the first guide rail is formed on the load support plate assembly, extends along the door moving direction, and has a first guide rail height;
wherein each one of said plurality of rolling members has an outer circumferential surface that defines a corresponding guide groove having a corresponding guide groove depth;
wherein each one of the corresponding guide groove depths is greater than the first guide rail height;
wherein the load support plate assembly comprises a first split body, a second split body, and a rotation pin;
wherein said rotation pin extends a direction that is perpendicular to the door moving direction, extends through an aperture in said first split body and extends through an aperture said second split body, which constrains said first split body and said second split body to rotation about said rotation pin; and
wherein said first split body and said second split body are overlapping in the transverse direction.

2. The sliding window system of claim 1, wherein:
the chassis support unit comprises two side slots respectfully accommodating two side portions of said load support plate assembly.

3. The sliding window system of claim 2, wherein:
each one of the two side slots of the chassis support unit respectively accommodates both a side portion of said first split body and a side portion of said second split body.

* * * * *